W. G. SCHOOLEY.
RAKE CLEANER.
APPLICATION FILED FEB. 13, 1914.
1,123,395.
Patented Jan. 5, 1915.
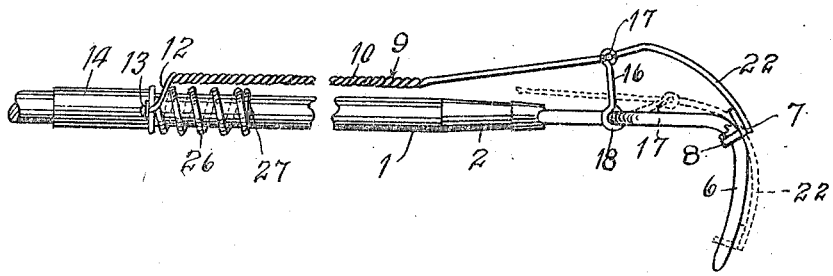
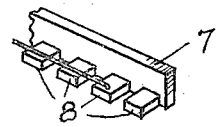
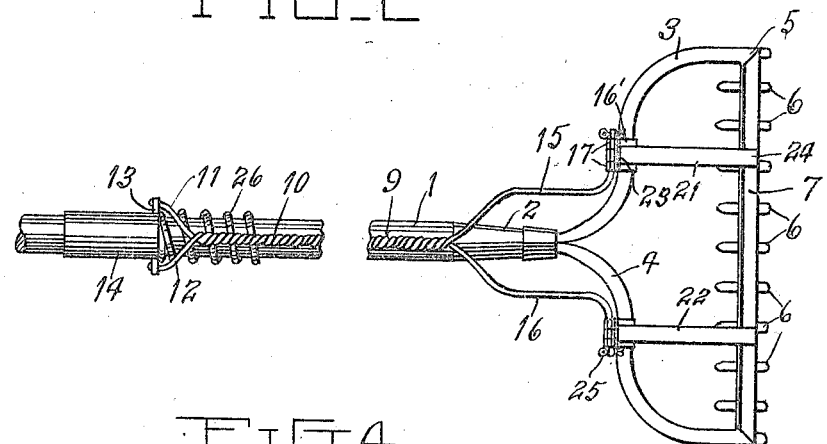
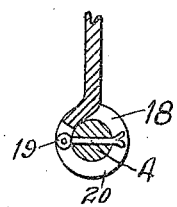
Witnesses
Charles H. Trotter
Inventor
W. G. Schooley
By
Attorney

UNITED STATES PATENT OFFICE.

WALTER G. SCHOOLEY, OF SIOUX FALLS, SOUTH DAKOTA.

RAKE-CLEANER.

1,123,395.

Specification of Letters Patent.

Patented Jan. 5, 1915.

Application filed February 13, 1914. Serial No. 818,527.

*To all whom it may concern:*

Be it known that I, WALTER G. SCHOOLEY, a citizen of the United States, residing at Sioux Falls, in the county of Minnehaha and State of South Dakota, have invented certain new and useful Improvements in Rake-Cleaners; and I do hereby declare the following to be a full, clear, and exact description of the invention, such as will enable others skilled in the art to which it appertains to make and use the same.

My invention relates to new and useful improvements in rakes and more particularly to a rake cleaning attachment therefor which may be operated to cleanse the teeth of trash or other foreign matter in a reliable and expeditious manner.

An important object of my invention is to provide a rake cleaning attachment of the character described which may be readily attached to rakes of all characters without requiring any material change in construction, in a reliable and expeditious manner.

Another important object of my invention is to provide a rake cleaning attachment of the character described which will automatically move into inoperative position so that the rake may be operated to perform its usual function without interference by the cleaning attachment.

Another important object of my invention is to provide a simple and inexpensive rake cleaner which consists of few parts, is reliable and efficient in operation and is cheap to manufacture.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views similar reference numerals designate corresponding parts: Figure 1 is a side elevation showing my device in assembled position, the dotted lines showing the position of the stripping bar and portion of the coöperating parts when in extended or cleaning position, Fig. 2 is a top plan view showing my device in assembled operative position, Fig. 3 is a detail perspective view of the stripping bar, and Fig. 4 is a sectional view showing the detail construction of one of the pivoted supporting links for the operating mechanism.

Referring to the drawings by characters of reference, the numeral 1 designates as an entirety a handle which is fitted at one end within the usual socket 2 that carries the usual curved securing arms 3 and 4 that are secured to the rake head 5. The rake head 5 is provided with the usual spaced teeth 6.

My improved rake cleaning attachment comprises a stripping bar designated 7 as an entirety and which is best illustrated in Fig. 3 in the drawings. The stripping bar 7 is provided with a plurality of right angular lugs 8. These lugs 8 are spaced and arranged between the teeth 6 of the rake so that the bar 7 in combination with the lugs 8 will serve to effectually remove all trash or other foreign matter from the teeth.

As a means for operating the stripping bar 7 I provide an operating rod designated 9 as an entirety. This operating rod is preferably formed of two sections of wire or other suitably stiff material and twisted as at 10 for a distance equivalent to approximately half its length. The inner ends of the wires comprising the rod 9 are diverged to provide a pair of arms 11 and 12 which are secured at their ends to ears 13 formed on the adjacent end of a slidable operating sleeve 14 that is mounted upon the handle 1. The outer ends of the wires comprising the rod 9 are diverged to provide angular arms 15 and 16, the free ends of which are operatively connected as will be later more fully described with pivoted supporting links 16'. The links 16' are bifurcated at each end to provide two pairs of spaced ears 17 and 18 respectively. The ears being preferably formed by rolling the arms formed by the bifurcation described. The ears 18 partially surround the arms or rods 3 and 4 and are arranged to permit the free movement of the links 16' relative to the arms 3 and 4. Cotter pins 19 are inserted through the space comprehended between the ears 18 and the arms 3 and 4 and bent as at 20 to lie between the ears 18. It will thus be seen that the cotter pins act as a guide and prevent sliding of the links 16' upon the rods 3 and 4.

Arcuate connecting bars 21 and 22 having apertured ears 23 formed on one end are secured at their other ends as at 24 to the stripping bar 7.

The apertured ears 23 on the arcuate bars 21 and 22 are disposed between the spaced ears 17 on the link 16' so that the openings therein are in alinement with the openings in the ears 17. The free ends of the arms 15 and 16 are extended through the ears 17 and 23 and have a cotter pin 25 inserted through their ends to prevent accidental withdrawal. The rod 9 has its end comprising the arms 11 and 12 so bent as to dispose the rod in superposed relation to the handle. The supporting links 16' are positioned at right angles to the arms 3 and 4 and adapted for rotation thereon as will be later more fully described.

As a means for returning the stripping bar 7 and coöperating parts to normal position I provide a helical expansion spring 26 that is secured at one end as at 27 upon the handle 1, is mounted upon to surround the handle and at its upper terminal adapted to engage the adjacent end of the sliding sleeve 14. Thus it will be seen that when the sleeve 14 is grasped by the operator and pushed downwardly upon the handle 1 that the action is against the tension of the spring 26. The downward pushing of the sleeve 14 moves or rotates the supporting links 16' and causes them to move forwardly and force the connecting bars 21 and 22 to push the stripping bar 7 downwardly with relation to the teeth 6, thus any foreign matter collected upon the teeth will be readily removed therefrom by the engagement with the lugs 8 or bar 7. When the operator releases his grip upon the sleeve 14 the spring 26 as will be readily seen forces the stripping bar 7 and coöperating parts back into normal position and the usual function of the weight may be had without interference.

It will be readily seen with reference to the foregoing description and accompanying drawings that I have provided simple and inexpensive rake cleaning means which may be readily attached to rakes of all characters without necessitating any material change in construction and operated in a reliable and expeditious manner to clean the teeth of the rake.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

What is claimed is:—

1. In a rake cleaner, the combination with a rake comprising a handle, a pair of securing arms carried at one terminal of said handle, and a head secured to said arms and having teeth thereon of a stripping bar slidable upon said teeth having a plurality of spaced right angular lugs thereon arranged between said teeth, a pair of supporting links loosely mounted upon said arms, a pair of arcuate bars secured at their terminals to said links and the stripping bar, a sleeve slidable upon said handle, an operating rod connected at its terminals to said sleeve and the supporting links, and a spring mounted upon said handle and engaging the sleeve to return the stripping bar to normal inoperative position.

2. In a rake cleaner the combination with a rake comprising a handle having a pair of spaced securing arms at one terminal and a head having teeth thereon connected with said arms of a stripping bar having spaced right angular lugs thereon arranged between the teeth, a pair of supporting links rotatably mounted upon said arms, arcuate bars pivotally connected with the links and secured to said stripping bar, a sleeve slidable upon said handle, an operating bar operatively connected at its terminals to said links and the sleeve and means to return said stripping bar to its normal position.

In testimony whereof I affix my signature in presence of two witnesses.

WALTER G. SCHOOLEY.

Witnesses:
ROB'T JOSEPHSON,
E. B. CLARK.

Copies of this patent may be obtained for five cents each, by addressing the "Commissioner of Patents, Washington, D. C."